July 5, 1966 SHINTARO OSHIMA ET AL 3,259,690

CODING SYSTEM FOR TELEVISION SIGNALS

Filed July 11, 1962 3 Sheets-Sheet 1

CODING SYSTEM FOR TELEVISION SIGNALS

Filed July 11, 1962 3 Sheets-Sheet 3

3,259,690

CODING SYSTEM FOR TELEVISION SIGNALS

Shintaro Oshima, Musashino-shi, Tokyo-to, Hajime Enomoto, Ichikawa-shi, and Kitsutaro Amano, Ota-ku, Tokyo-to, Japan, assignors to Kokusai Denshin Denwa Kabushiki Kaisha, Tokyo-to, Japan, a joint-stock company of Japan Filed July 11, 1962, Ser. No. 209,205
Claims priority, application Japan, Sept. 11, 1961, 36/32,170
5 Claims. (Cl. 178—6)

Figure 1:
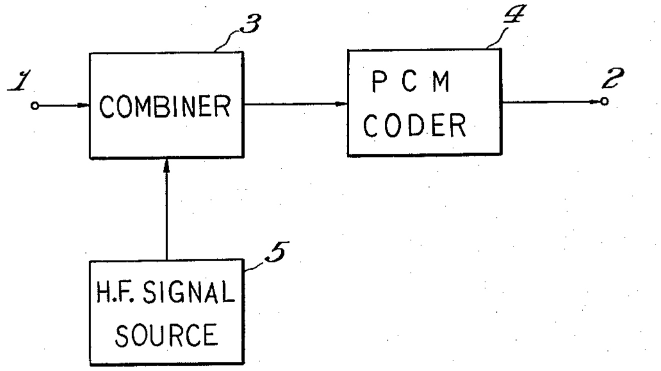

This invention relates to a coding system for television signals, and more particularly, it relates to a coding system wherein a television or video signal to be coded is superposed upon at least one high-frequency signal having a frequency approximating an odd multiple of one half of the horizontal scanning frequency of this system, and the combined signal is applied to a pulse-code-modulation (PCM) coder, whereby the television signal is converted into a pulse-code-modulated signal.

One object of this invention is to provide a coding system having minimum quantizing noise, even if the number of PCM bits is a minimum.

Another object of this invention is the compression of the frequency-band for transmitting a television signal in the case of utilization of pulse code modulation.

A further object of this invention is to provide a high-fidelity coding system for television signals in the case of normal pulse code modulation by superposing said high frequency signal upon the television signal to be coded as above-stated.

A still further object of this invention is to provide a so-called "half-tone" and to eliminate the so-called "contour" in the regenerated television signal which is peculiar to the PCM signal.

The transmission of signals by the PCM system has many advantages. That is, in this system it is possible to suppress the noise in the channel completely and to assure a reliable transmission of the original signal if the signal-to-noise ratio in the channel is kept up over the threshold level of this system. However, a PCM system is inevitably accompanied by a so-called quantizing noise, and in a television picture a so-called contour of one quantum level appears as the quantizing noise at the place where the brightness of original signal changes continuously.

This contour stands out particularly in the background where the brightness changes gradually. In order to reduce this quantizing noise, the employment of PCM of more than six bits with narrow quantum level is desirable. However, such a PCM system requires complicated coding equipment and, moreover, a wide band-width for transmitting the information signal.

Furthermore, in order to reduce the contour effectively, one method wherein voltages of positive and negative polarities and one half or one quarter (½ or ¼) of one quantum level are superposed alternately for every frame of television signal has been proposed. In this case, the brightness changes for every frame, therefore it is effectively equivalent to the case in which the number of PCM bits is doubled. However, it has the disadvantage in that the picture flickers because the vertical scanning frequency is low.

In this invention, the television signal is coded to a PCM signal after application of a high frequency signal to be superposed thereon, and the quantizing noise is reduced effectively by making good use of the physiological function of the visual sense.

Figure 3:
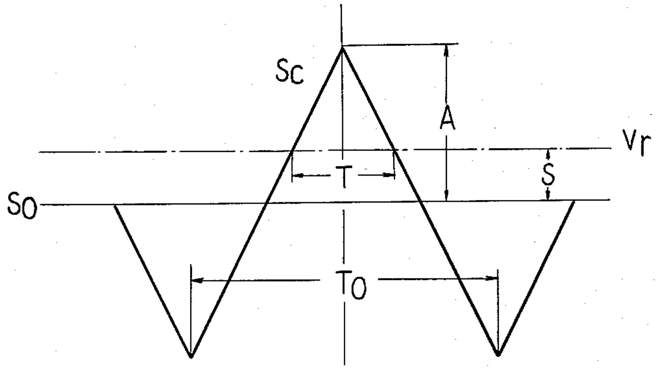
Figure 2:
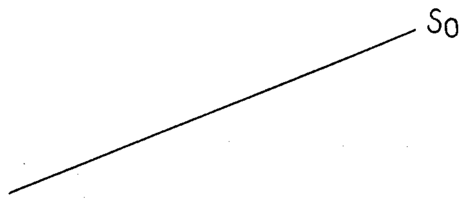
Figure 2:
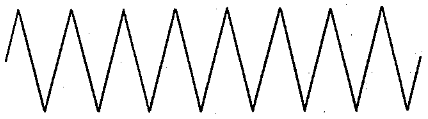
Figure 2:
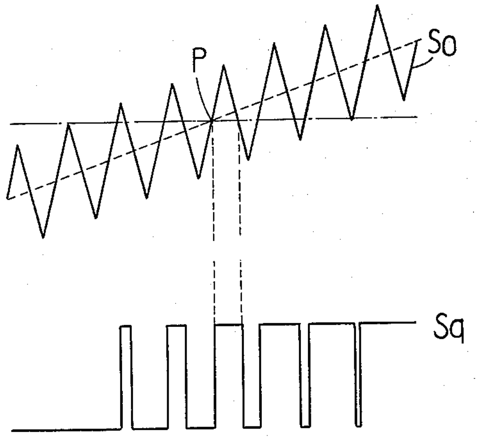
Figure 2:
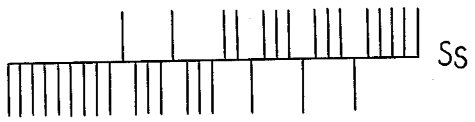
Figure 2:
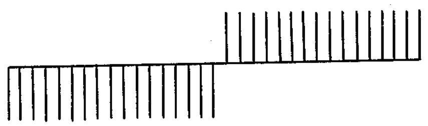

The novel features of this invention are set forth with particularity in the appended claims. This invention, however, both to its principle and system, together with further objects and advantages thereof, may best be understood by reference to the following description, taken in conjunction with the accompanying drawing in which:

FIG. 1 is a block diagram showing the coding system of the invention;

FIGS. 2(A), (B), (C), (D), (E), and (F) are graphical representations indicating waveforms of the coding system of the present invention in the case of application to the quantization by one PCM bit;

FIG. 3 is a graphical diagram explaining the principle of this coding system; and FIGS. 4(A), (B), (C), (D), and (E) are graphical representations indicating waveforms of the coding system of the invention in the case of application to the quantization by two PCM bits.

In the block diagram of the coding system according to the present invention shown in FIG. 1, the input signal at input terminal 1 is a television signal (original signal) which is to be coded. At a combiner 3, a high-frequency signal supplied from a high-frequency signal source 5 is superposed on the television signal, and the combined output signal from combiner 1 is applied to a PCM coder 4. The combined signal is converted to a PCM signal in this coder 4.

In order to simplify the following description, the principle of this coding system will be described in the case of the quantization by one PCM bit. FIG. 2(A) shows a part of a television signal $S_o$. In FIG. 2(B), a high-frequency signal $F_o$ to be superposed is shown, and this signal is supplied from the high-frequency signal source 5. The frequency of said signal $F_o$ is much higher than that of the television signal $S_o$. A signal $S_c$ as shown in FIG. 2(C) is obtained at the output terminal of the combiner 3. This signal $S_c$ is applied to the PCM coder 4 and coded under the condition in which a voltage $V_r$ is adopted as its reference voltage. When a sampling frequency $f_s$ is much higher than the frequency $f_o$ of the superposing signal $F_o$, a signal $S_q$ as shown in FIG. 2(D) is obtained at the output terminal 2

FIG. 3 is an enlarged representation of a part of a scanning line. It is assumed that the high-frequency signal to be combined is a triangular wave, and that its frequency is higher than that of the television signal. As shown in FIG. 3, it is assumed also that the period of the triangular wave is $T_o$, its amplitude A is equal to one quantum level, the signal level is S, and the duration in which the high-frequency signal $F_o$ exceeds the reference voltage $V_r$ is T. The brightness B is obviously proportional to $T/T_o$, and the following relation is obtained.

$$B=k(T/T_o)=k'(½+S/2A) \quad (1)$$

That is, it is clear from Equation 1 that the brightness B is proportional to the signal level S, and the information of brightness is converted into the width of the pulses (pulse wide modulation).

In the above description, the sampling frequency $f_s$ is assumed to be much higher than the frequency $f_o$ of the high-frequency signal $F_o$. In practice, however, said frequencies are of the same grade. As a result, the coded output signal, as shown in FIG. 2(E), becomes a form of PNM (pulse number modulation) signal in which the density of positive pulse is proportional to the brightness.

The coded output signal of an ordinary PCM system is as shown in FIG. 2(F) because the signal exceeds the reference voltage $V_r$ at the point P in FIG. 2(C). By comparing the output signal of this coding system shown in FIG. 2(E) with the output signal of an ordinary PCM system shown in FIG. 2(F), it will be apparent that less quantizing noise and high fidelity are obtained by this coding system.

As mentioned above, the pulse trains shown in FIG. 2(E) appear in each scanning line and in each field, so that a brightness proportional to the original signal can be obtained statistically in the reproduced picture, and unnatural contours due to quantizing noise can be eliminated. Although the superposing signal $F_o$ is sinusoidal in practice, it is nearly equal to a triangular-wave, so that Equation 1 is approximately valid.

In the case wherein the original signal has a contour, that is, a sudden change of brightness, this contour is reproduced with high fidelity, because the amplitude of the superposed signal $F_o$ is set equal to one quantum level.

Figure 4:
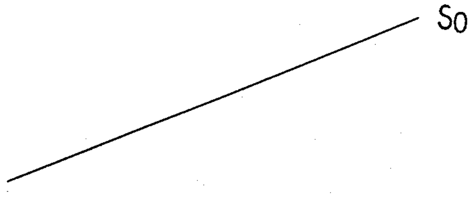
Figure 4:
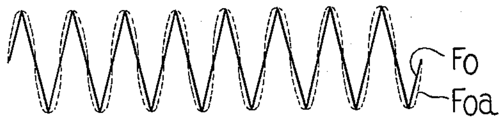
Figure 4:
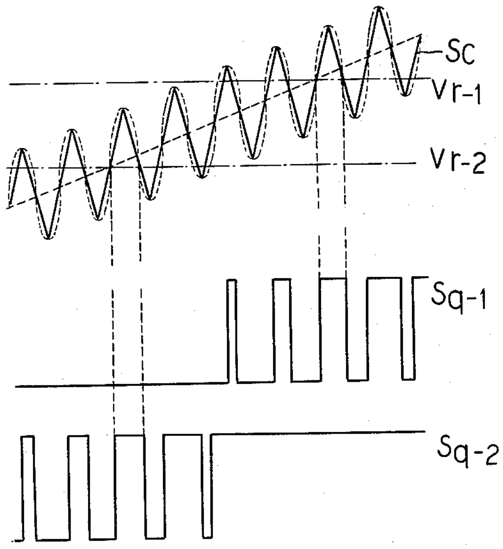
Figure 4:
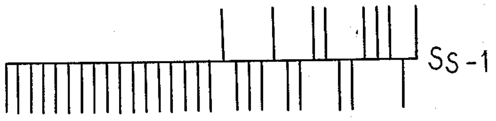
Figure 4:
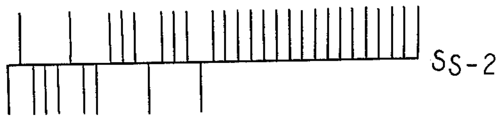

In the above description, it is assumed that the number of PCM bits is one. However, this coding system can be applied to a system including two or more PCM bits and can obtain a good picture. In this case, an output signal as shown in FIG. 2(E) is obtained corresponding to each of the reference voltages. In FIGS. 4(B) and 4(C), the case of quantization by two PCM bits is shown, and, furthermore, the superposed signal $F_{oa}$ in the case of a sinusoidal-wave is shown by broken line. However, in FIGS. 4(D–1), 4(D–2), 4(E–1), and 4(E–2), the illustrations with reference to only the triangular wave are shown. A further description is omitted because the operation is easily understood by analogy with the above-mentioned case of quantization by one PCM bit. With increase of the number of PCM bits, the bandwidth for transmitting the coded signal increases.

In this paragraph, the frequency of the superposing signal $F_o$ will be described. Since the signals shown in FIG. 2(E) and FIG. 4(E) correspond to scanning lines, when the phase of the signal $F_o$ between one of the horizontal scanning lines and the immediately adjoining horizontal scanning lines of the said scanning line in the succeeding field is the same in the interlaced scanning system, stripes appear on the picture. These stripes are undesirable and degrade the quality of the reproduced picture. In order to prevent these stripes from appearing on the picture, the phase of the high frequency signal $F_o$ in one horizontal scanning line of one field must be opposed to that of the immediately adjoining horizontal scanning line in the succeeding field. For this reason, the frequency $f_o$ must satisfy the following relation.

$$f_o=(f_d/2)(2n+1) \quad (2)$$

where $f_d$ is the horizontal scanning frequency,
$n$ is a positive integer.

That is, the frequency $f_o$ of the superimposed signal $F_o$ must be an odd multiple of one half of the horizontal scanning frequency. From the viewpoint of the resolving power of the human eye and the quality of the reproduced picture, the higher the frequency $f_o$ is, the better. When a higher frequency is adopted as the frequency $f_o$, said frequency $f_o$ may be set to a value approximating an odd multiple of one half of the horizontal scanning frequency because the increasing of frequency of the superposed signal is equivalent to the increasing of naturalness of reproduced picture, whereby stripes on the reproduced picture become invisible. As a result, the frequency of the subcarrier-wave (3.5 mc.) or its higher harmonic in color television is suitable for said frequency $f_o$ of the superposed signal. If a slight degradation of quality of picture is allowable, the frequency $f_o$ can be set below 3.5 mc. Moreover, if necessary, a second superposing signal which satisfies the Equation 2 can be mixed with the first superposing signal.

To ascertain the above mentioned principle, a PCM coder was made by utilizing tunnel diode logical circuits, and satisfactory results were obtained experimentally.

Although this invention has been described with respect to a few particular embodiments thereof, it is not to be so limited as changes and modifications may be made therein which are within the full intended scope of the invention, as defined by the appended claims.

What we claim is:

1. A coding system for television transmission comprising, a combiner means for receiving a video signal having a given horizontal scanning-line frequency and for receiving at least one high frequency signal and combining it with said video signal to deliver a combined signal output, a high frequency signal source for applying to said combiner means said high frequency signal with said high frequency signal having a frequency accurately an odd multiple of one half of said given horizontal scanning-line frequency and means connected to receive said signal output and convert it to a pulse-code-modulated signal.

2. A coding system for television transmission, combiner means for receiving a video signal having a given horizontal scanning frequency and for receiving a single high frequency signal and combining it with said video signal to deliver a combined signal output, a high frequency signal source of applying to said combiner means said high frequency signal with said high frequency signal having a frequency accurately an odd multiple of one half of said given horizontal scanning-line frequency, and means connected to receive said signal output and convert it to a pulse-code-modulated signal.

3. A coding system for television transmission comprising, combiner means for receiving a video signal having a given horizontal scanning frequency and for receiving a high frequency signal and combining it with said video signal to deliver a combined signal output, a high frequency signal source for applying to said combiner means said high frequency signal with said high frequency signal comprising a triangular waveform and having a frequency accurately an odd multiple of one half of said given horizontal scanning-line frequency, and means connected to receive said signal output and convert it to a pulse-code-modulated signal.

4. A coding system for television transmission comprising, combiner means for receiving a video signal having a given horizontal scanning frequency and for receiving a high frequency signal and combining it with said video signal to deliver a combined signal output, a high frequency signal source for applying to said combiner means said high frequency signal with said high frequency signal comprising a sinusoidal signal having a frequency accurately an odd multiple of one half of said given horizontal scanning-line frequency, and means connected to receive said signal output and convert it to a pulse-code-modulated signal.

5. A coding system for television transmission comprising, combiner means for receiving a video signal having a given horizontal scanning frequency and for receiving a high frequency signal and combining it with said video signal to deliver a combined signal output, coder means connected to receive said signal output and convert it to a pulse-code-modulated signal, and a high frequency signal source for applying to said combiner means said high frequency signal with said high frequency signal having a frequency accurately an odd multiple of one half of said given horizontal scanning-line frequency and a peak to peak value substantially equal to a one quantum level in said coder means.

References Cited by the Examiner

UNITED STATES PATENTS

| | | | |
|---|---|---|---|
| 2,146,804 | 2/1939 | Dowsett. | |
| 2,625,604 | 1/1953 | Edson. | |
| 2,669,608 | 2/1954 | Goodall | 325—42 |
| 2,974,195 | 3/1961 | Julesz | 325—38 |

DAVID G. REDINBAUGH, *Primary Examiner.*

R. M. HESSIN, J. McHUGH, *Assistant Examiners.*